(12) United States Patent
Rao et al.

(10) Patent No.: US 11,790,322 B1
(45) Date of Patent: Oct. 17, 2023

(54) SYSTEMS AND METHODS FOR PUBLISHING AND MANAGING SEGMENTED JOBS AND NOTIFICATIONS ON AN ONLINE PLATFORM

(71) Applicant: WorkLlama, LLC, Atlanta, GA (US)

(72) Inventors: Gururaj Rao, Marietta, GA (US);
Pratik Jagad, Marietta, GA (US);
Anantha Rao, Marietta, GA (US);
Saleemuddin Khaja, Marietta, GA (US);
Sudhakar Maruvada, Duluth, GA (US)

(73) Assignee: WorkLlama, LLC, Atlanta, GA (US)

( * ) Notice: Subject to any disclaimer, the term of this patent is extended or adjusted under 35 U.S.C. 154(b) by 1,012 days.

(21) Appl. No.: 15/888,695

(22) Filed: Feb. 5, 2018

Related U.S. Application Data

(60) Provisional application No. 62/454,251, filed on Feb. 3, 2017.

(51) Int. Cl.
*G06Q 10/00* (2023.01)
*G06Q 10/1053* (2023.01)
*H04L 67/02* (2022.01)
*H04L 51/52* (2022.01)

(52) U.S. Cl.
CPC ............ *G06Q 10/1053* (2013.01); *H04L 51/52* (2022.05); *H04L 67/02* (2013.01)

(58) Field of Classification Search
CPC ... G06Q 10/1053; G06Q 50/01; G06Q 10/105; G06Q 10/063112; G06Q 30/02; G06Q 10/06; G06Q 10/10; G06Q 30/0251; G06Q 10/06311; G06Q 10/06398; G06Q 30/0241; G06Q 30/0277; G06Q 30/0282; G06Q 50/10; G06Q 50/2057

USPC ........................................................ 705/321
See application file for complete search history.

(56) References Cited

U.S. PATENT DOCUMENTS

| | | | |
|---|---|---|---|
| 6,662,194 B1* | 12/2003 | Joao ................ | G06Q 10/06311 705/1.1 |
| 8,401,887 B2* | 3/2013 | Moukas et al. .... | G06Q 30/0249 705/7.29 |
| 2002/0123921 A1* | 9/2002 | Frazier .......... | G06Q 10/063112 705/7.14 |
| 2002/0128894 A1* | 9/2002 | Farenden ....... | G06Q 10/063112 705/7.14 |
| 2005/0048961 A1* | 3/2005 | Ribaudo et al. .... | H04M 7/0036 455/419 |

(Continued)

OTHER PUBLICATIONS

15888695 EIC 3600 Search Report 120220 (Year: 2020).*

(Continued)

*Primary Examiner* — Gabrielle A McCormick
(74) *Attorney, Agent, or Firm* — Brian J. Colandreo; Heath M. Sargeant; Holland & Knight LLP

(57) ABSTRACT

Systems and methods are disclosed for providing tiered opportunity postings in a web-based platform. In one embodiment, the tiered opportunity postings are for job postings. A job publisher may configure a job opportunity based on various parameters such as credential criteria, previous employment, availability, etc., and further publish the opportunity on a web-based platform. A job seeker may access the web-based platform and be presented with the opportunity if the job seeker matches the various parameters configured by the job publisher. The job publisher may further publish the opportunity in tiers, wherein a first tier is a group of candidates with preferred credentials, and a subsequent tier may include less strict requirements.

16 Claims, 10 Drawing Sheets

(56) References Cited

U.S. PATENT DOCUMENTS

| | | | | |
|---|---|---|---|---|
| 2012/0179617 | A1* | 7/2012 | Adams et al. | G06Q 10/02 705/321 |
| 2012/0185402 | A1* | 7/2012 | Lajoie | G06Q 30/02 705/321 |
| 2012/0271675 | A1* | 10/2012 | Christensen et al. | G06Q 10/1053 705/7.14 |
| 2013/0097093 | A1* | 4/2013 | Kolber et al. | G06Q 10/1053 705/321 |
| 2014/0058954 | A1* | 2/2014 | Perlstein et al. | G06Q 50/188 705/80 |
| 2014/0074738 | A1* | 3/2014 | Thankappan et al. | G06Q 10/1053 705/321 |
| 2014/0297550 | A1* | 10/2014 | Miller et al. | G06Q 50/01 705/321 |
| 2015/0032762 | A1* | 1/2015 | Stef-Praun | G06Q 10/1053 707/754 |
| 2015/0170103 | A1* | 6/2015 | Garg et al. | G06Q 10/1053 705/321 |
| 2015/0248649 | A1* | 9/2015 | Avats | G06Q 50/01 705/321 |
| 2015/0248693 | A1* | 9/2015 | Dubey | G06Q 30/0244 705/14.43 |
| 2015/0356511 | A1* | 12/2015 | Campesi et al. | G06Q 10/1053 705/321 |
| 2016/0034854 | A1* | 2/2016 | Kamat | G06Q 50/01 705/321 |
| 2017/0011325 | A1* | 1/2017 | Hanna et al. | G06Q 10/1053 |
| 2018/0308061 | A1* | 10/2018 | Al Jadda et al. | G06Q 10/10 |

OTHER PUBLICATIONS

Montoya, Melissa. ("257 jobs cut at UTB". McClatchy-Tribune Business News [Washington] Apr. 3, 2013.) (Year: 2013).*

* cited by examiner

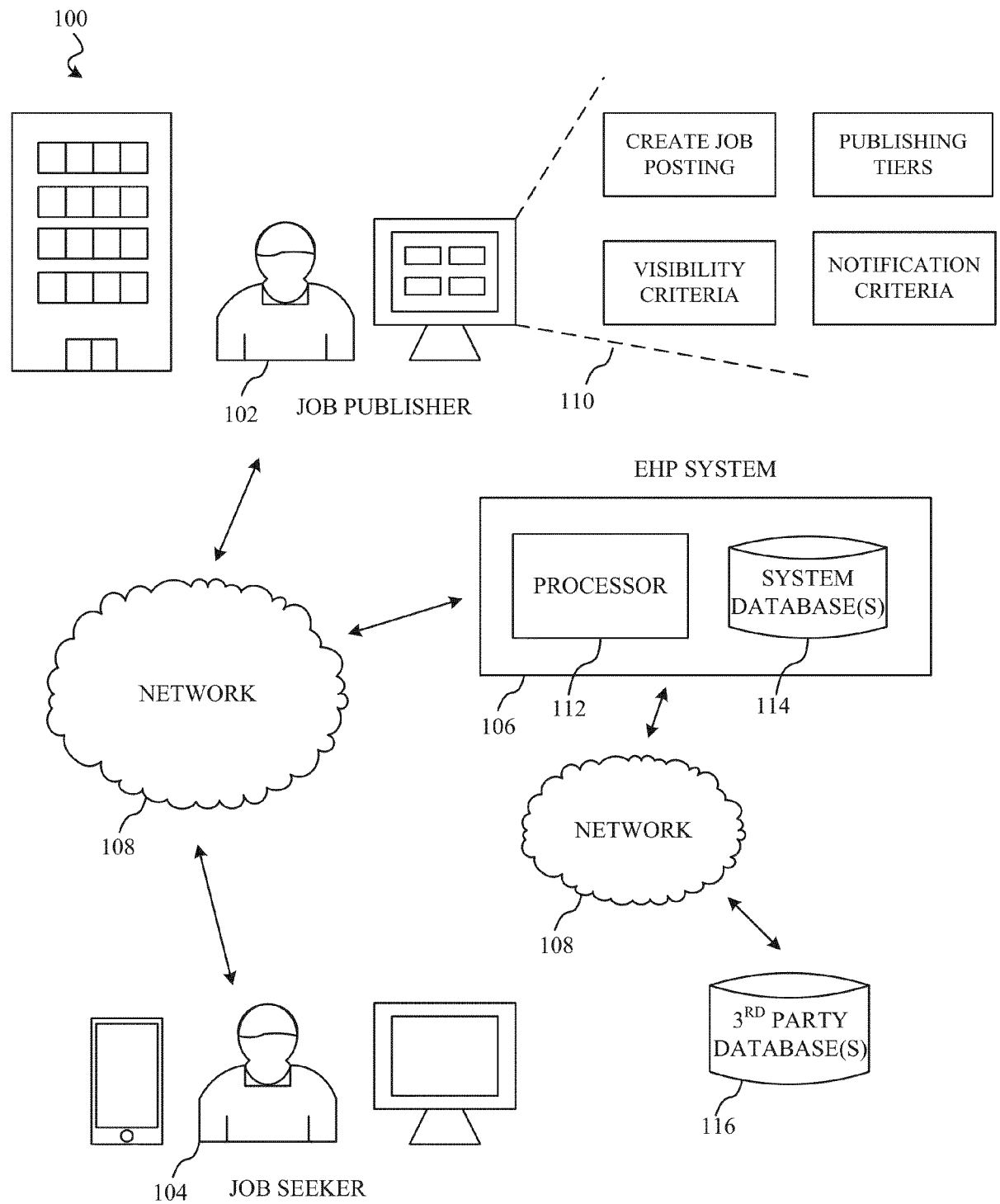
FIG. 1 EXEMPLARY SYSTEM ENVIRONMENT

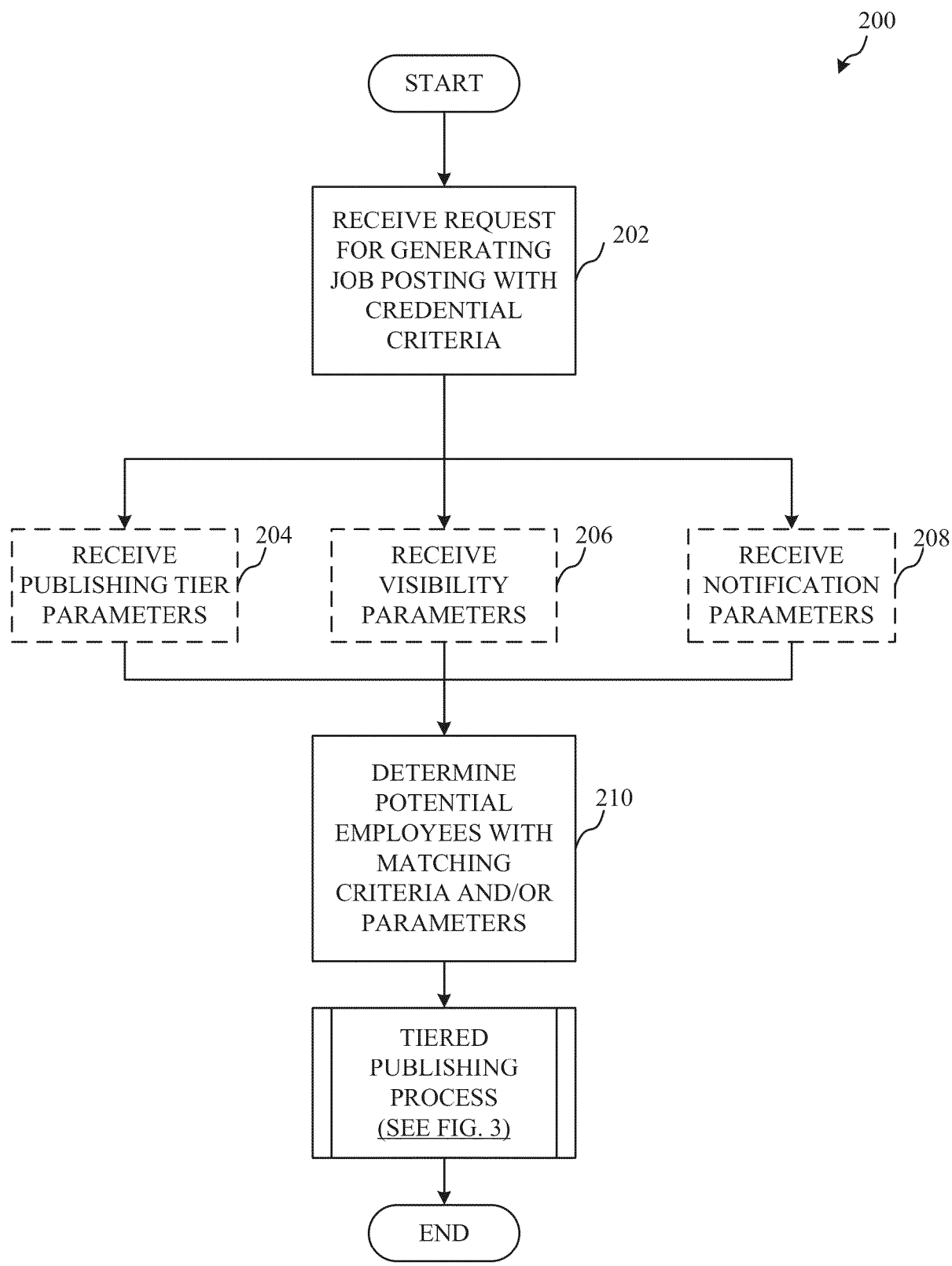
FIG. 2 EXEMPLARY JOB POSTING CREATION PROCESS

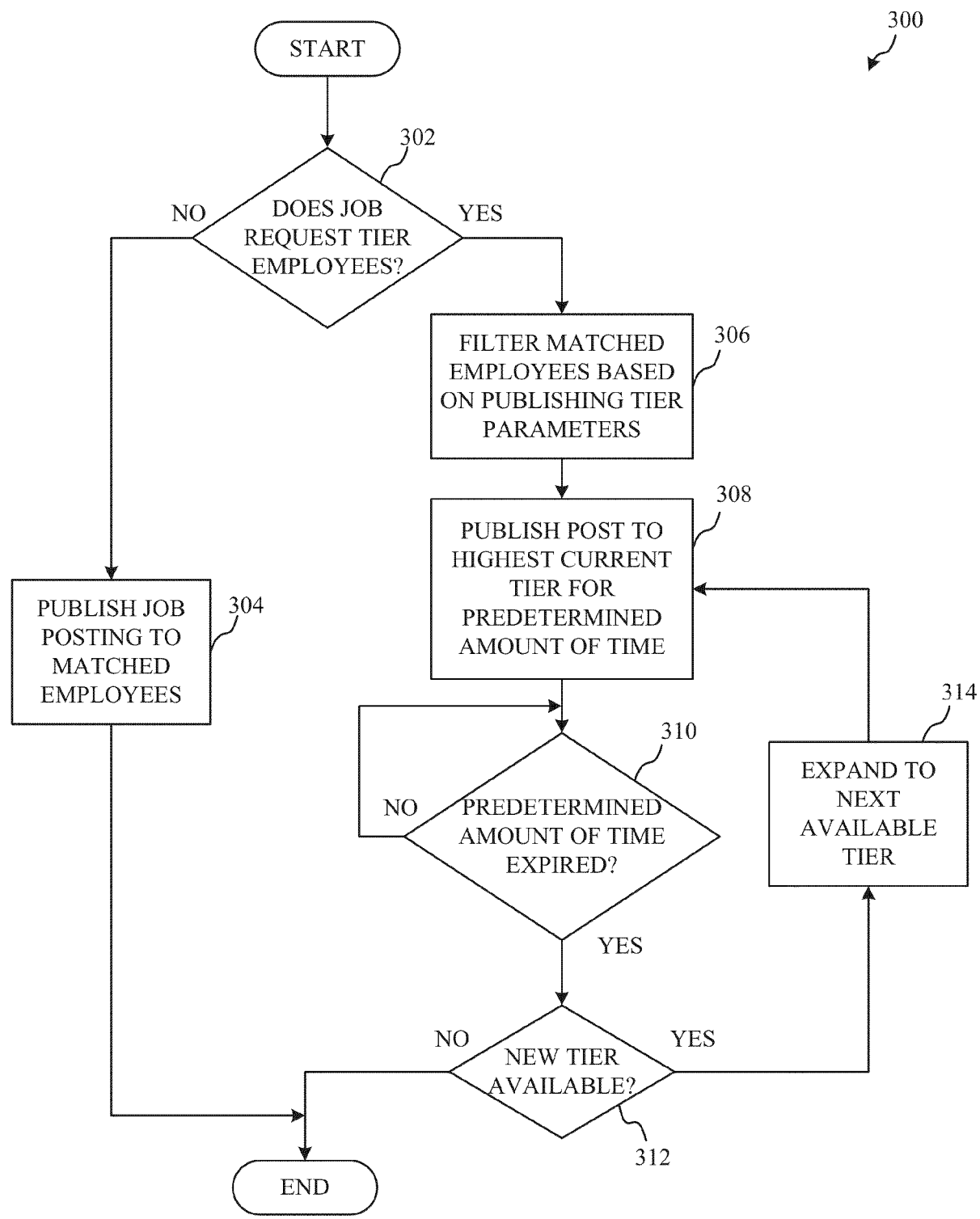
FIG. 3 EXEMPLARY TIERED PUBLISHING PROCESS

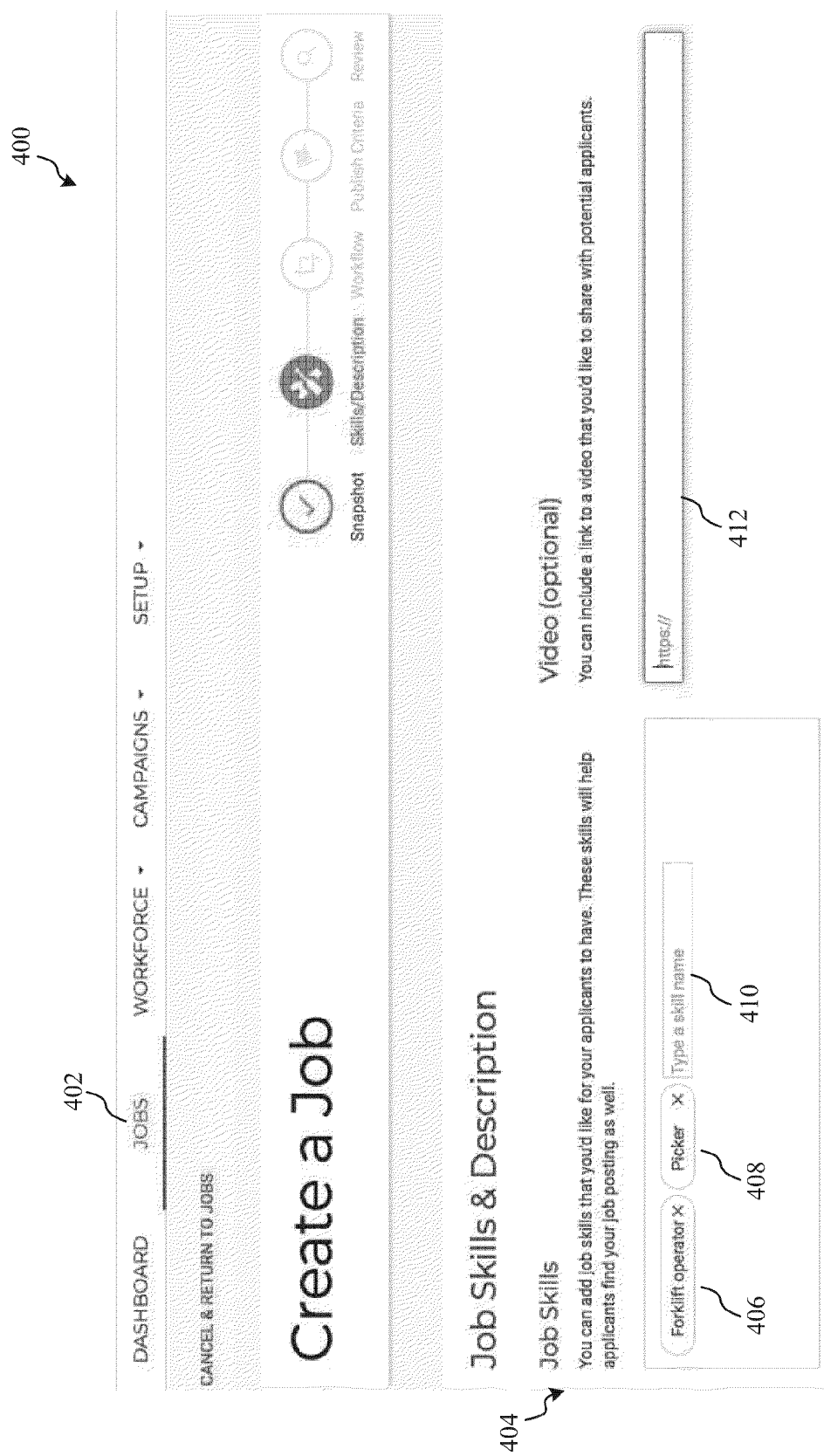
FIG. 4 EXEMPLARY JOB CREATION PAGE

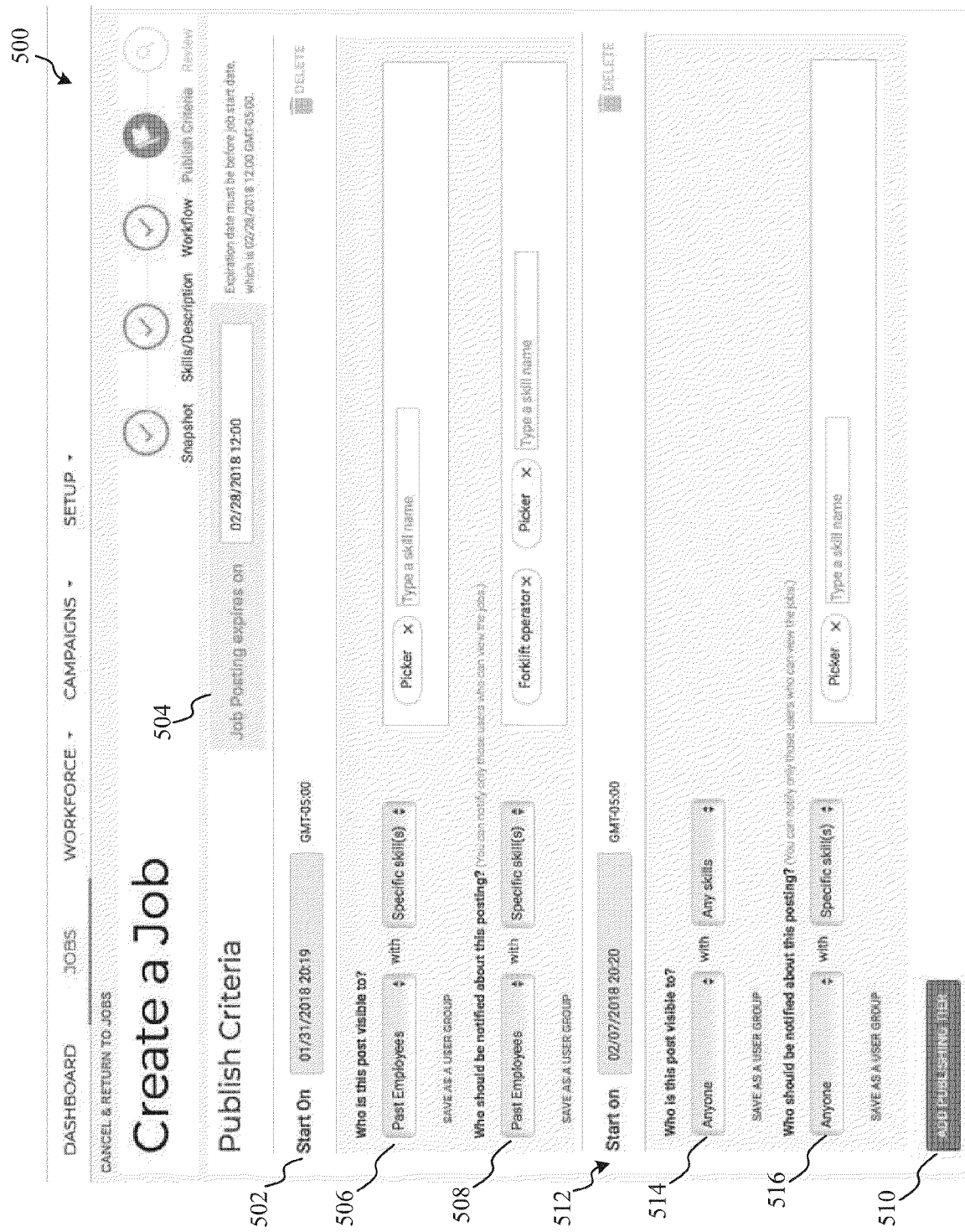
FIG. 5 EXEMPLARY PUBLISHING CRITERIA PAGE

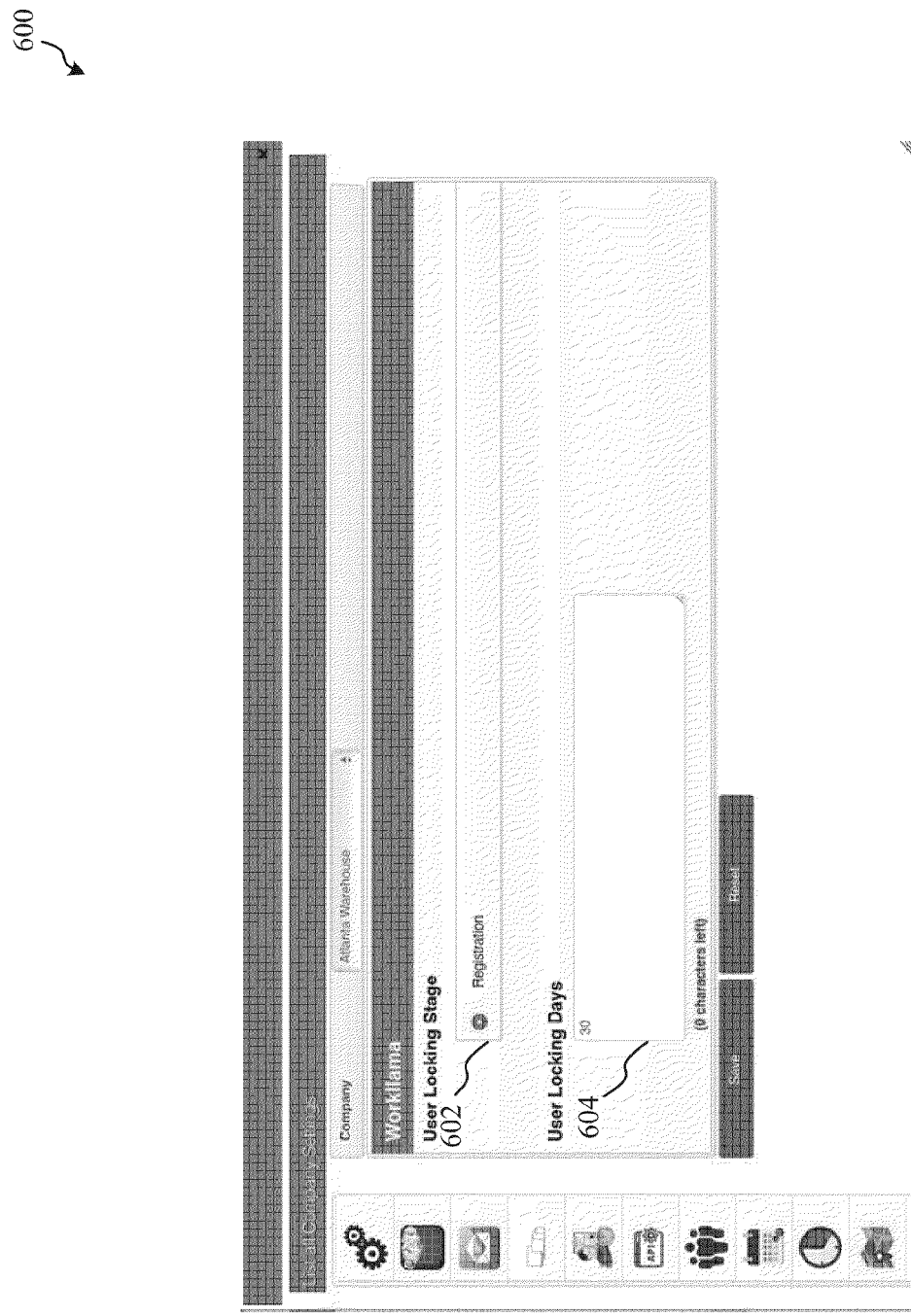
FIG. 6 EXEMPLARY LOCKED-IN DESIGNATION PAGE

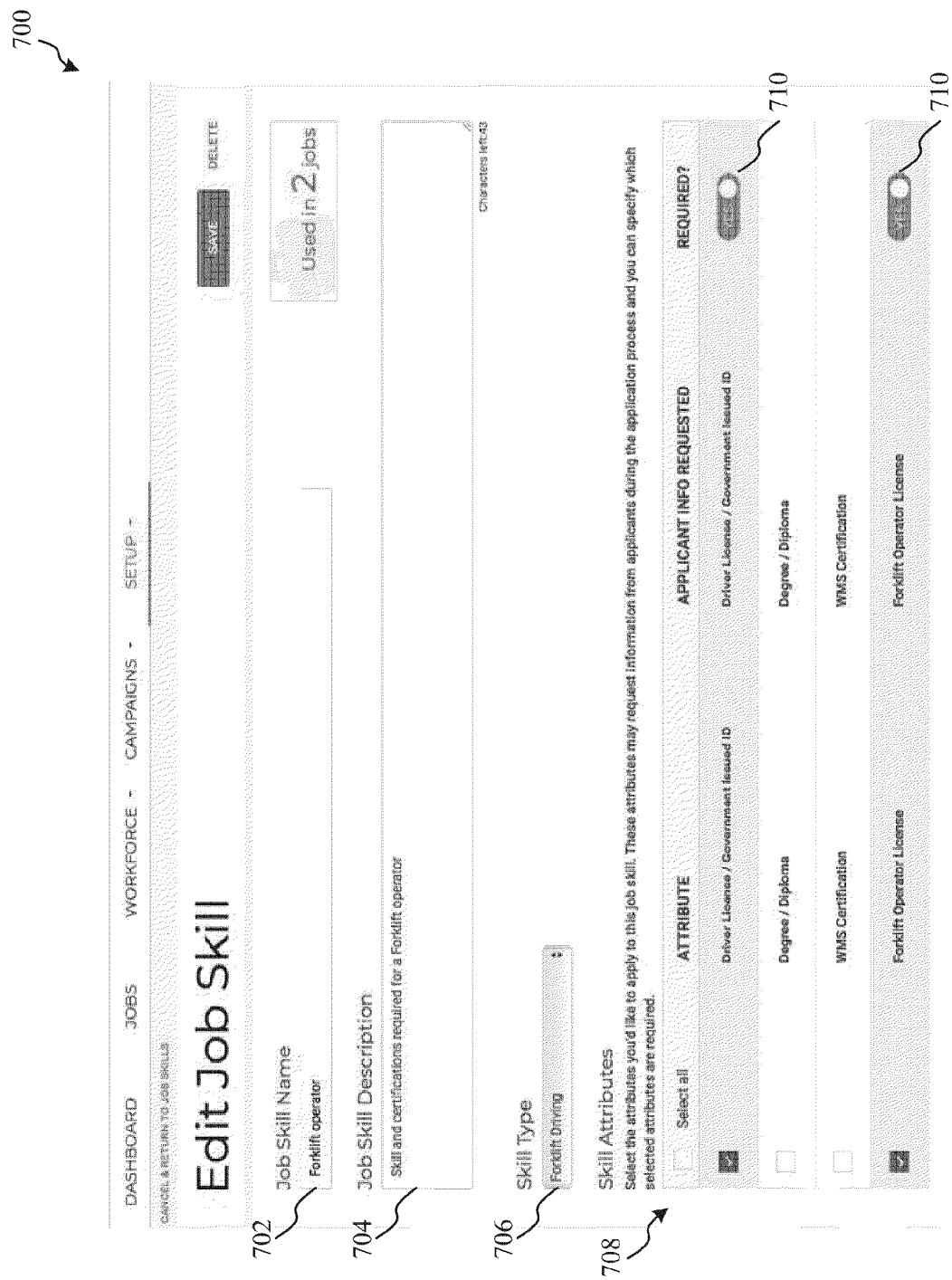
FIG. 7 EXEMPLARY SKILL CONFIGURATION PAGE

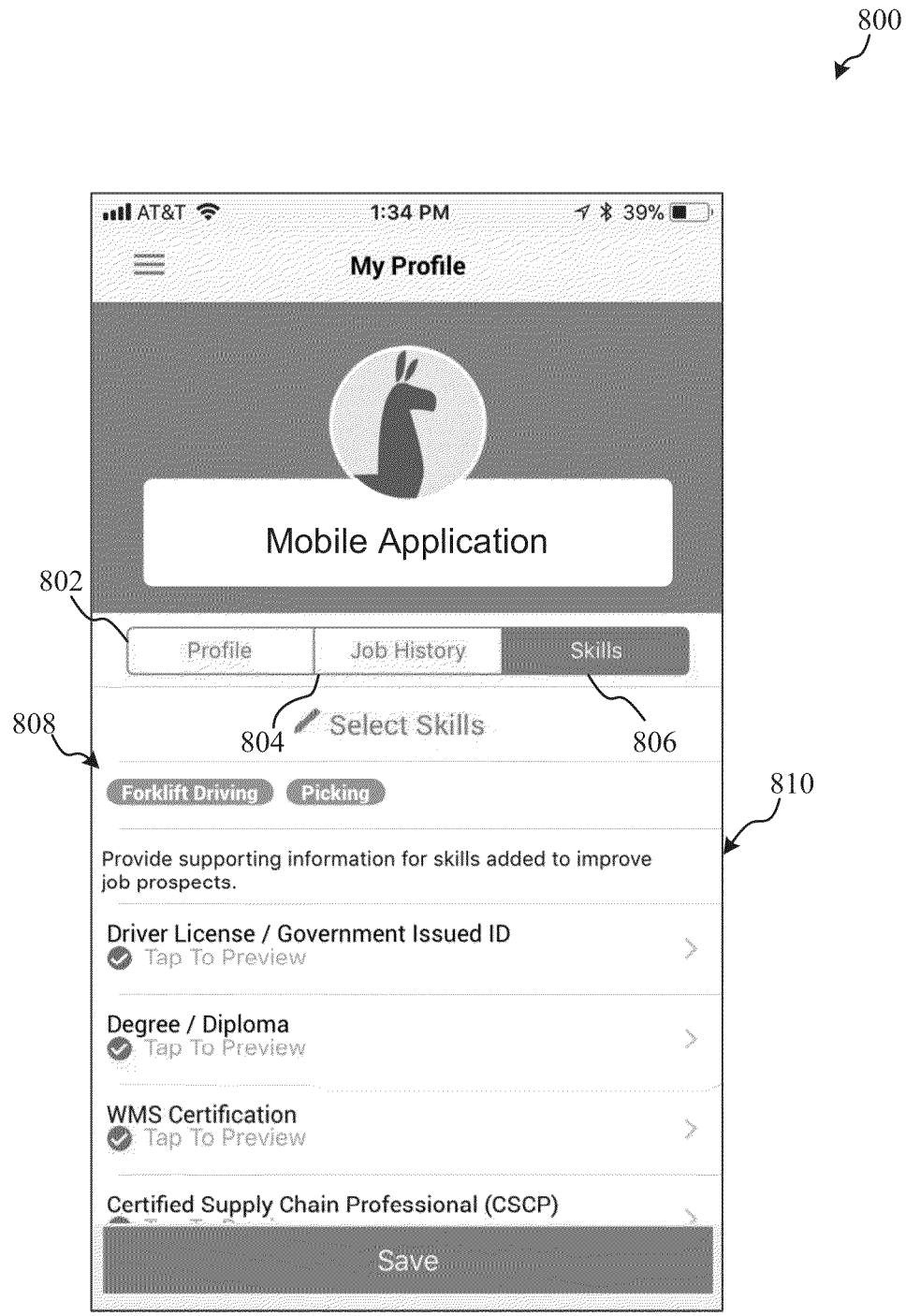
FIG. 8 EXEMPLARY MOBILE APPLICATION PROFILE

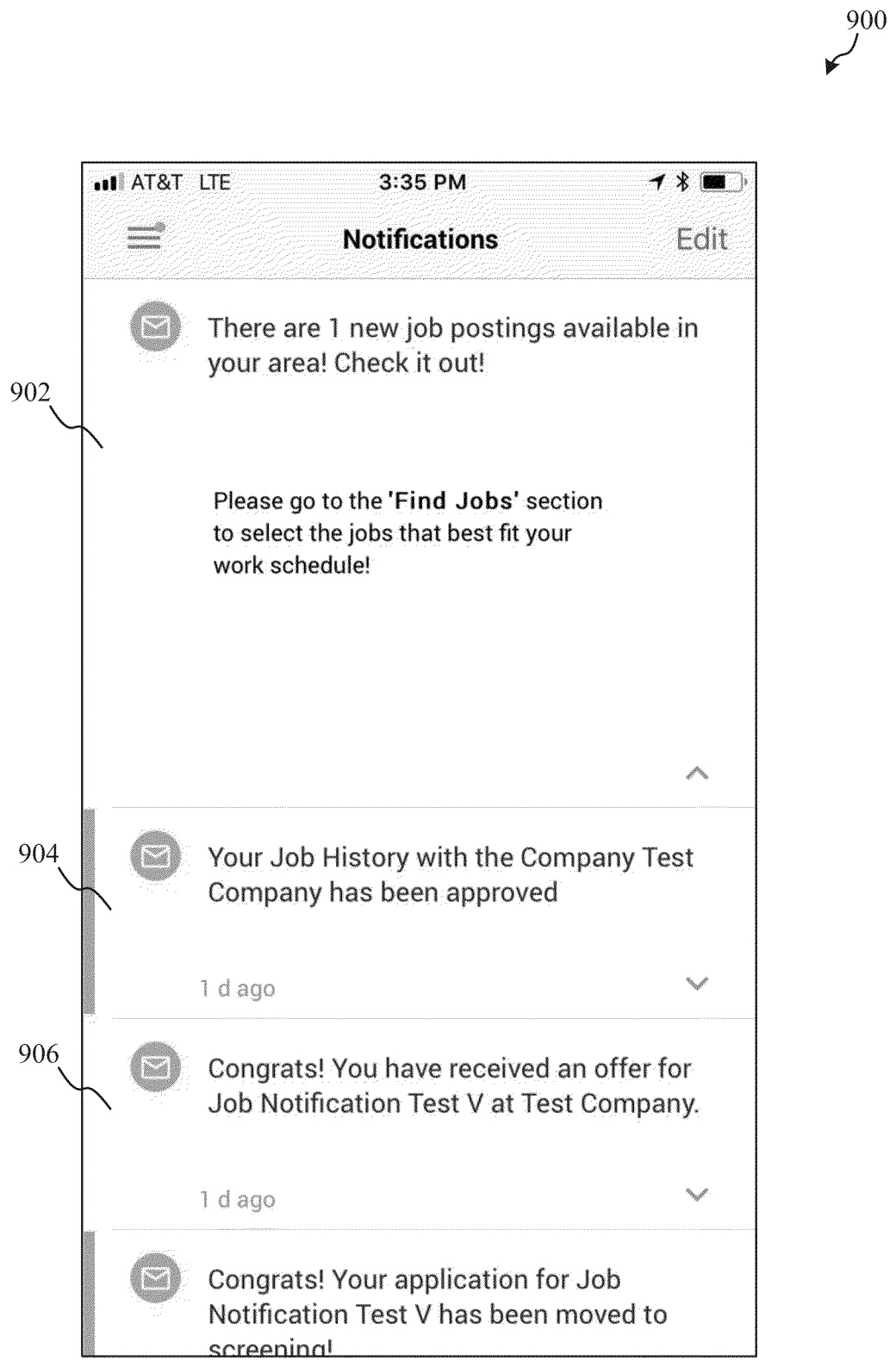
FIG. 9 EXEMPLARY NOTIFICATION PAGE

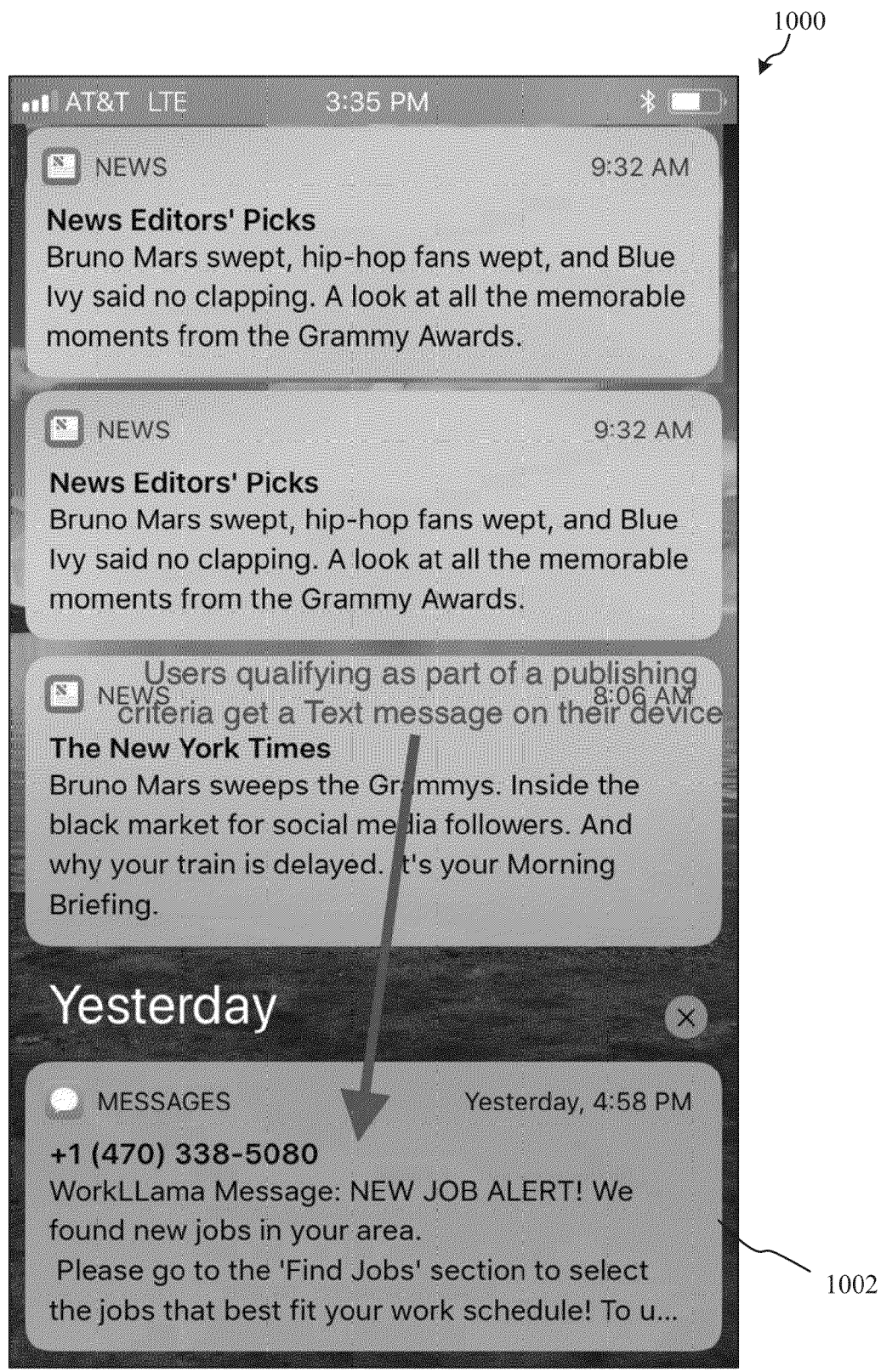
FIG. 10 EXEMPLARY PUSH NOTIFICATION

SYSTEMS AND METHODS FOR PUBLISHING AND MANAGING SEGMENTED JOBS AND NOTIFICATIONS ON AN ONLINE PLATFORM

CROSS REFERENCE TO RELATED APPLICATIONS

This application claims the benefit of and priority to U.S. Provisional Pat. App. No. 62/454,251, entitled "SYSTEMS AND METHODS FOR PUBLISHING SEGMENTED JOBS AND NOTIFICATIONS ON AN ONLINE PLATFORM", filed Feb. 3, 2017, the disclosure of which is incorporated by reference in its entirety as if the same were fully set forth herein.

TECHNICAL FIELD

The disclosed systems and methods relate generally to publishing and managing job postings on an online platform, and more particularly to publishing and managing job postings according to predetermined tiers.

BACKGROUND

Social networking has become a way to not only connect people socially but also professionally. Websites such as Monster.com and LinkedIn.com allow for professionals to search for open job positions, upload resumes, and connect with current and previous colleagues. These websites provide the basic tools to communicate with professionals; however, there exists a long felt but unresolved need for systems and methods to target specific groups of people with segmented timelines and criteria.

BRIEF SUMMARY OF THE DISCLOSURE

The present systems and methods relate generally to publishing and managing job postings (available positions) on an online platform. Traditional methods of publishing online job positions typically involve posting one or more available positions on a platform whereby the general public may view and respond to the published job posting. Some online platforms allow for job publishers to filter or narrow the target audience by segmenting the criteria for the job. These published job postings are statically segmented and a new job must be posted with a different set of required criteria if a new target audience is desired. Embodiments of the disclosed systems and methods allow for a job to be published with dynamic segmentation, thereby allowing for the job to be published to multiple target audiences over a predetermined period of time based on specific job criteria and parameters.

In various embodiments, an individual (e.g., a potential employee) may voluntarily provide information such as his/her contact information and professional credentials to the system via a registration process or the like. In some embodiments, the system may have access to third party data sources from other hiring platforms, companies, etc. In one embodiment, the system may store all data associated with the employees and employers in one database. In some embodiments, the system may include multiple disparate databases, wherein each database stores particular data associated with particular employees. For example, one database may store information associated with individuals who are previous employees of a particular company, and a separate database may store information associated with individuals who have at least one year of relevant work experience. In some embodiments, including multiple disparate databases may improve efficiency when determining target audiences and segments (e.g., specialized databases may reduce lookup times for data). In certain embodiments, the system may be able to target individuals (via email, text message, etc.) regarding a job posting regardless if he/she has ever provided the system with his/her contact information or professional credentials due to the system's ability to leverage third party data.

In an example scenario, consider a trucking company that may need to hire a driver under a three month contract. According to aspects of the present disclosure, the trucking company may set predetermined publishing parameters that define how the job is to be published across the disclosed system. In one embodiment, the system can be configured to publish the job to only previous employees of the company (i.e. a first target segment) and the listing may be active for a time period of two days (or some other predetermined time period). At the time of publishing, the trucking company may have preconfigured the job listing to be published beyond the previous employee target audience if no acceptable candidates were identified during the predetermined time period (e.g., the job listings represent "concentric-circles" over a pool of potential employees). In that scenario, the posting may further be published to an audience this is not former employees but that has at least one year of truck driving experience (i.e. a second target segment) and the listing may be published for an additional two days (a second predetermined time period). This process of having multiple segments to a job posting allows for the trucking company to target their ideal employee first and then later target different audiences while still considering employees from the first target audience, or not.

It should be understood from the discussion herein that the posting and management of positions can be handled from various computing devices such as laptop computers, smart phones, tablets, etc.

BRIEF DESCRIPTION OF DRAWINGS

Aspects of the disclosure and relevant information relating to the disclosure can be found in the attached Exhibits, which are incorporated herein by reference:

FIG. 1 is a diagram illustrating an exemplary system environment, according to one aspects of the present disclosure;

FIG. 2 is a flowchart illustrating an exemplary job posting creation process, according to one aspect of the present disclosure;

FIG. 3 is a flowchart illustrating an exemplary tiered publishing process, according to one aspect of the present disclosure;

FIG. 4 is an exemplary screenshot of the web-based platform illustrating the job creation page, according to one aspect of the present disclosure;

FIG. 5 is an exemplary screenshot of the web-based platform illustrating publishing criteria options, according to one aspect of the present disclosure;

FIG. 6 is an exemplary screenshot of the web-based platform illustrating the "locked-in" functionality, according to one aspect of the present disclosure;

FIG. 7 is an exemplary screenshot of the web-based platform illustrating skill configuration, according to one aspect of the present disclosure;

FIG. 8 is an exemplary screenshot of a user profile on a mobile application, according to one aspect of the present disclosure;

FIG. 9 is an exemplary screenshot of a notification on a mobile application, according to one aspect of the present disclosure; and FIG. 10 is an exemplary screenshot of a notification on a mobile device, according to one aspect of the present disclosure.

DETAILED DESCRIPTION OF EXHIBITS

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described illustrated embodiments, and any further applications of the principles of the disclosure as illustrated therein are contemplated as would normally occur to one skilled in the art to which the disclosure is related. All limitations of scope should be determined in accordance with and as expressed in the claims.

The present systems and methods relate generally to publishing and managing job postings (available positions) on an online platform. Traditional methods of publishing online job positions typically involve posting one or more available positions on a platform whereby the general public may view and respond to the published job posting. Some online platforms allow for job publishers to filter or narrow the target audience by segmenting the criteria for the job. These published job postings are statically segmented and a new job must be posted with a different set of required criteria if a new target audience is desired. Embodiments of the disclosed systems and methods allow for a job to be published with dynamic segmentation, thereby allowing for the job to be published to multiple target audiences over a predetermined period of time based on specific job criteria and parameters.

In various embodiments, an individual (e.g., a potential employee) may voluntarily provide information such as his/her contact information and professional credentials to the system via a registration process or the like. In some embodiments, the system may have access to third party data sources from other hiring platforms, companies, etc. In one embodiment, the system may store all data associated with the employees and employers in one database. In some embodiments, the system may include multiple disparate databases, wherein each database stores particular data associated with particular employees. For example, one database may store information associated with individuals who are previous employees of a particular company, and a separate database may store information associated with individuals who have at least one year of relevant work experience. In some embodiments, including multiple disparate databases may improve efficiency when determining target audiences and segments. In certain embodiments, the system may be able to target individuals (via email, text message, etc.) regarding a job posting regardless if he/she has ever provided the system with his/her contact information or professional credentials due to the system's ability to leverage third party data. According to various aspects of the present disclosure, the present systems and methods improve upon the technical field of electronic job and opportunity searching and matching by providing a cloud-based and distributed solution including connecting potential employees with employers via the internet and allowing employers to target potential employees according to criteria based tiers, and further allowing potential employees to receive notifications regarding potential job opportunities in real-time via push notifications received on computing devices such as smart phones. It should be understood from the discussion herein that an employee or potential employee may be any worker for any type of job or task that may be listed within the platform.

Referring now to the drawings, FIG. 1 is a diagram illustrating an exemplary system 100 environment, according to one aspect of the present disclosure. In particular embodiments, the system 100 is a web-based system allowing various entities, such as corporations and individuals, to digitally communicate for optimizing job hiring outcomes. In various embodiments, the system 100 includes at least one job publisher 102, at least one job seeker 104 (e.g., potential employee), and a cloud-based electronic hiring platform ("EHP") system 106 for facilitating job publishing, each of these components of the system 100 operatively connected over a network 108. In a particular embodiment, the exemplary system 100 may be hosted on a closed network, such as a network owned by a corporation, and is not cloud-based. According to various aspects of the present disclosure, the job publisher 102 may be a hiring agent, an HR director at a corporation, or any other entity or individual interested in acquiring aide for services via the EHP system 106. In a particular embodiment, the job publisher 102 may use a computing device (e.g., desk top computer, smart phone, tablet, etc.) for accessing the EHP system 106 for publishing jobs. In some embodiments, the computing device associated with the job publisher 102 may present the job publisher 102 with publishing parameters 110, where the publishing parameters 110 are options for customizing a job post for particular potential employees or job seekers 104 based on various criteria. These publishing parameters will be discussed in greater detail below in the discussion of FIG. 2.

Continuing with FIG. 1, the publishing parameters 110 may be presented to the job publisher 102 in response to the job publisher 102 accessing the EHP system 106 and initiating a request for creating a job post/publication. In some embodiments, the EHP system 106 is a cloud-based system which supports the front-end use of a digital hiring platform or application by corporations for posting job publications. Additionally, in various embodiments, the EHP system 106 supports the front-end use of the digital hiring platform or application by job seekers 104. According to various aspects of the present disclosure, job seekers 104 may access the EHP system 106 via computing devices such as smart phones, desktop/laptop computers, tablets, etc., and the EHP system 106 may present the job seekers 106 with published jobs that fit the particular job seekers 106 experience, skills, availability, etc.

In various embodiments, the EHP system 106 includes a processor 112, one or more system databases 114, as well as an operable connection over the network 108 to one or more third party databases 116. According to various aspects of the present disclosure, the one or more system databases 114 include data such as records of potential employees that are registered with the EHP system 106, the potential employees' previous work experience, skills, etc. In some embodiments, the EHP system 106 may query the one or more third party databases 114 for accessing data such as potential employees not registered with the system 106, which may allow for the job publishers 102 to notify these potential employees about published jobs or prompt them to visit the web-based platform. In some embodiments, the EHP system 106 may allow for job publishers 102 to manage the schedules or work shifts of job seekers 106 that have already been hired by the job publisher 102.

FIG. 2 is a flowchart illustrating an exemplary job posting creation process 200, according to one aspect of the present disclosure. As will be described in greater detail immediately below, the process 200 illustrates how a job post is created and published to the job seekers 106. In one embodiment, the process 200 begins at step 202, where the EHP system 106 receives a request for generating a job posting with predetermined credential criteria. In a particular embodiment, the request is generated by the job publisher 102 and transmitted to the EHP system 106 via the job publishers 102 associated computing device. For example, the job publisher 102 may be a hiring manager at a home improvement store, and the hiring manager may be looking to hire someone with credentials such as forklift driving experience. According to various aspects of the present disclosure, the EHP system 106 may receive a request with credential criteria, such as prior forklift driving experience, and further generate the job posting.

Continuing with FIG. 2, in one embodiment and in response to receiving a request for generating a job posting at step 202, the process 200 proceeds to the optional steps 204, 206, and 208, which include receiving publishing tier parameters, receiving visibility parameters, and receiving notification parameters, respectively. In particular embodiments, the job publisher 102 may decide to include these parameters either simultaneously or in sequence to the step 202. In various embodiments, the publishing tier parameters of step 204 include rules or logic for deciding how to categorize a particular group of potential employees into multiple smaller tiered groups based on factors such as experience, required pay, available start date, etc. In certain embodiments, the visibility parameters of step 206 may include parameters such as predetermined time periods for displaying the job posting to potential employees. For example, one visibility parameter may include presenting the job posting to all potential employees who previously worked for the job publisher. Another example may include presenting the job posting to each publishing tier from step 204 for only a 24 hour period. In some embodiments, the step 208 includes receiving parameters for determining which potential employees the EHP system 106 should notify regarding the published job posting. For example, the EHP system 106 may be configured to send emails or SMS messages to potential employees with particular skills at predetermined time periods or in response to new job postings. In some embodiments, the publishing parameters received at step 204 may include the visibility parameters and notification parameters received at optional steps 206 and 208, respectively.

Proceeding now to step 210, in response to receiving the request for generating a job posting with particular credential criteria at step 202, and further receiving publishing tier parameters, visibility parameters, and notification parameters from the optional steps 204, 206 and 208, at step 210 the EHP system 106 may determine potential employees with criteria and/or parameters that match with those defined in steps 204-208. In various embodiments, at step 210 the EHP system 106 may query the one or more system databases 114, as well as the one or more third party databases 116 for data that matches or corresponds to the received parameters from the previous steps. According to various aspects of the present disclosure, determining potential employees that match the defined criteria and/or parameters allows for the EHP system 106 to fill the published job posting with a job seeker 104.

In response to determining potential employees with matching credential criteria and parameters, the process 200 may proceed to the tiered publishing process 300. As will be described in greater detail below in the discussion of FIG. 3, the tiered publishing process 300 is the process by which the EHP system 106 publishes the job postings to potential employees/job seekers 104 (either according to predetermined tiers, or not). In response to the tiered publishing process 300, job seekers 104 may apply for the jobs directly, or contact the job publisher 102 for additional information regarding the job posting.

Referring now to FIG. 3, a flowchart is shown illustrating the exemplary tiered publishing process 300, according to one aspect of the present disclosure. The process 300 begins at step 302, where the EHP system 106 determines if the request for a job posting received at step 202 from FIG. 2 includes publishing tier parameters (optionally added according to step 204). According to various aspects of the present disclosure, the job posting request may include publishing tier parameters which define two or more publishing tiers (e.g., a tier of first choice potential employees and other subsequent tiers of second, third, fourth, etc., choice employees). If it is determined at step 302 that the job request from step 202 does not include publishing tier parameters, the process 300 may proceed to step 304 where the job posting is published to all matched employees (e.g., no tiers). If at step 302 it is determined that the job request does include publishing tier parameters, the process 300 proceeds to step 306.

In one embodiment, step 306 includes filtering matched employees based on the publishing tier parameters. For example, the publishing tier parameters for the first tier may include having prior employment history with the job publisher 102, and the parameters for the second tier may include three or more years of relevant work experience. In this scenario, the potential employees that have prior work experience with the job publisher 102 may be presented with the posting first, and after a predetermined amount of the time the posting may be presented to the tier of employees that have three or more years of relevant experience but have not previously worked for the job publisher 102.

In various embodiments, the process 300 proceeds to step 308 where the job post is published to the highest current tier for a predetermined amount of time. In one embodiment, the predetermined amount of time may be included in the initial request for generating the job at step 202, or the predetermined amount of time may be configured when publishing tier parameters are established at step 204.

In particular embodiments, at step 310 the EHP system 106 checks if the predetermined amount of time for the currently presented tier has expired. If the predetermined amount of time has not expired, the process may continue to check for expiry until the predetermined amount of time has passed. If at step 310 the predetermined amount of time has expired, the EHP system 106 checks for additional tiers to publish to at step 312. If at step 312 the EHP system 106 determines that there are no additional tiers to be posted to, the process 300 may end. If at step 312 the EHP system determines that there are one or more additional tiers to publish the job posting to, the EHP system 106 may proceed to step 314 where the currently expired tier is switched for the next available tier. In one embodiment, step 314 may include changing a portion of the logic included in the EHP system 106 to target secondary tiers for publishing job postings.

In various embodiments, and in response to expanding the currently expired tier to introduce the next available tier at step 314, the system may proceed back to step 308, where the EHP system 106 may publish the post to the highest current tier for a predetermined amount of time. According to various aspects of the present disclosure, this process may continue until each of the tiers (as configured based on the publishing tier parameters) has been published to or if the job(s) is fulfilled.

FIG. 4 is an exemplary screenshot of the job creation page 400 of the web-based platform, according to one aspect of the present disclosure. In various embodiments, a job publisher 102 may access the job creation page 400 by logging into the web-based platform and selecting the jobs tab 402. In a particular embodiment, the functionality provided by the job creation page 400 allows for the job publisher 102 to initiate a request for creating or generating a job posting, as described in step 202 of FIG. 2. As shown in the present embodiment, the job creation page 400 includes a job skills section 404 where the job publisher 102 may include particular skills desired or experience needed for the job posting. In this particular embodiment, the job skills section 404 includes skills such as "forklift operator" 406 and "picker" 408, and the job publisher 102 may include more skills by entering the skill into the skill search bar 410. In some embodiments, the job creation page 400 allows for the job publisher 102 to include a link 412 to an online hosted video that may describe the job requirements, explain the skills needed, etc.

Turning now to FIG. 5, a publishing criteria page 500 of the web-based platform is shown, according to one aspect of the present disclosure. Similar to the functionality allowed by the job creation page 400, the publishing criteria page 500 allows for the job publisher 102 to further configure the parameters of the particular job posting as well as create publishing tiers. According to various aspects of the present disclosure, the publishing parameters configured via the publishing criteria page 500 are described above in steps 204, 206, and 208 of FIG. 2. In various embodiments, the publishing criteria page 500 allows for a job publisher 102 to optionally indicate a start date 502 for the tier, an expiration date 504 for the job posting, configure post visibility 506 (e.g., visible only to past employees with "picker" skills), and select potential employees to notify 508 (e.g., past employees with skills such as "forklift operator" and "picker"). In certain embodiments, the job publisher 102 may select the "add publishing tier" button 510 to be presented with options for further configuring or specializing the publishing criteria into tiers. For example, in response to selecting the button 510 to add a publishing tier, the user may be presented with the additional section 512 of the publishing criteria page 500 for further narrowing or broadening the publishing criteria. As shown in the present embodiment, the job publisher 102 may configure the particular job to be available on a date after the start date 502 to have a wider post visibility 514 (e.g., visible to anyone with any skills) and broader notification criteria 516 (e.g., anyone with picker skills may be notified).

Continuing with FIG. 5 and for the purpose of understanding, consider an example where a job publisher 102, the owner of a trucking company, is seeking a delivery driver to begin working in one week. In this example, the job publisher 102 does not have much time to find a match for this job, so the job publisher 102 may target particular groups of potential employees/job seekers 104 in order to increase the chances of quickly filling this role. In one embodiment, the job publisher may configure a first tier which is to be published immediately to only previous employees that have 5 years of trucking experience, an active trucking license, active trucking certifications, and a clean driving record. In this example, the first tiered potential employees may receive notifications from the EHP system 106 regarding this job opportunity. The job publisher 102 may set a predetermined amount of time, such as two days, before a second tier of potential employees receives notifications regarding the job opportunity. For example, the second tier of potential employees may meet the same parameters as the first tier, but the second tier may exclude the requirement for having previously worked for the job publisher 102. In various embodiments, by excluding the necessity of having prior work experience with the job publisher 102, a more broad group of potential employees may be reached that are still highly qualified. In some embodiments, the job publisher 102 may continue to configure tiers and publishing criteria until the job publisher 102 is satisfied. According to various aspects of the present disclosure, the tier and publishing criteria may include, but are not limited to, GPS location of a job seeker's mobile device and its proximity to the trucking company, driving record data and statistics (e.g., acceleration patterns, braking patterns, etc.), insurance records, etc.

In certain embodiments, the application of generating tiers for publishing jobs may be implemented across various industries such as operating restaurants, dog walking, baby sitting, etc. For example, a chef many be included in a top tier for receiving job notifications because he/she has raving reviews on service rating websites (such as Yelp.com). In certain embodiments, the EHP system 106 may be operable to automatically search for these reviews and scan the text within the review for extracting relevant information (e.g., performance indicators) that may be helpful to a job publisher 102 looking to create tiered job posts.

In one embodiment, FIG. 6 illustrates the ability to implement a "locked-in" period for job publishers 102. According to various aspects of the present disclosure, to prevent unfair hiring techniques such as employee poaching, the EHP system 106 may allow for job publishers 102 to configure a time period where the job seekers 104 may not be presented with new job postings from other job publishers; however, the job seeker 104 may still search for and apply to available jobs within the EHP system 106. In various embodiments, the job publisher 102 may indicate a stage 602 of the job (e.g., during registration) where the user may not be presented with additional job postings from other job publishers, and the current job publisher 102 may further configure a time period 604 for how long during or after the stage 602 the job seeker 104 may be "locked-in" and unavailable to receive notifications from other job publishers.

FIG. 7 is a screenshot of the web-based platform illustrating the skill configuration page 700, according to one aspect of the present disclosure. In one embodiment, the skill configuration page 700 allows for a job publisher 102 to describe the skills required or desired from a job seeker 104 in order to achieve an appropriate match for the job posting. In particular embodiments, the skill configuration page allows for the job publisher 102 to configure a job skill name 702 (e.g., "Forklift Operator"), a skill description 704 (e.g., certified to operate forklifts), a skill type 706 (e.g., forklift driving), and skill attributes 708. In various embodiments, the skill attributes 708 may include one or more attributes that may be commonly associated with the selected skill type 706. In the present embodiment, skill attributes 708 such as driver license, degree/diploma, Warehouse Management System (WMS) certification, and forklift operator license are shown as being associated with skill type 706 such as forklift driving. In certain embodiments, the job publisher 102 may further configure one or more of the skill attributes 708 to be required for the particular job posting by selecting or dragging the slide bar 710 to indicate the necessity for the skill.

In one embodiment, FIG. 8 illustrates a screenshot from a user profile on a mobile device. According to various aspects of the present disclosure, users such as job seekers 104 may access the EHP system 106 via a web browser or downloaded mobile application on his/her computing device. In one embodiment, FIG. 8 illustrates an exemplary screenshot of what a job seeker 104 may be presented with via the mobile application. As shown in the present embodiment, the job seeker 104 may select tabs within the mobile application such as a profile tab 802 which may allow the job seeker 104 to enter his/her demographic information, a job history tab 804 which may allow the job seeker 104 to enter his/her previous employment information, and a skills tab 806 which may allow the job seeker 104 to describe his/her particular skills (either from previous employment or independently learned). In one embodiment, the job seeker 104 may enter skills 808 such as forklift driving and picking, and further enter associated and supporting documentation 810 for those skills (e.g., driver license, degree, etc.). In response to entering this information, a job seeker 104 may begin to receive notifications for job listings that match the job seeker's 104 credentials.

FIG. 9 is a screenshot of the mobile application illustrating exemplary job posting notifications, according to one aspect of the present disclosure. In various embodiments, the mobile application may include a notifications page 900 where a job seeker 104 may be presented with notifications regarding new jobs, job offers, progress relating to previous interviews or documentation screenings, or other relevant notifications. As shown in the present embodiment, the notification 902 illustrates the job seeker 104 being presented with a notification regarding a new job that has been posted that the job seeker 104 should investigate. Also shown in the present embodiment, previous notifications include an approval notification 904 notifying the job seeker 104 that his/her job history has been approved by a particular company. In some embodiments, this notification allows for the job seeker 104 to know the status of his/her application or profile when seeking a new job. In one embodiment, the job seeker 104 may be presented with an offer notification 906 illustrating jobs with particular credential criteria that have been determined to match with the job seeker's 104 profile.

In one embodiment, FIG. 10 is a screenshot 1000 of a notification on a user's mobile device, according to one aspect of the present disclosure. In various embodiments, a job seeker 104 may allow for the EHP system 106 to send push notifications to his/her computing device regarding new job postings, updates in a hiring process, etc., to his/her computing device. As shown in the present embodiment, the job seeker 104 may receive a push notification 1002 from the EHP system 106 alerting him/her about new job postings detected in his/her area. In various embodiments, because the job seeker 104 provided the EHP system 106 with his/her demographic information, the EHP system 106 may be operable to monitor new job postings within a certain configurable geographical area around the user's address, provided zip code, or desired work region. In certain embodiments, receiving push notifications such as the notification 1002 allows for the job seeker 104 to receive potential job information in near-real time, thereby facilitating improved job placement outcomes.

EXEMPLARY FUNCTIONALITY

Tiered Postings With Predetermined Parameters

In one embodiment, job publishers 102 can segment a targeted group of potential job seekers 104 into tiered groups, whereby the tiers are established by the job publishers 102 and typically include desired skills and qualifications. In various embodiments, the first tier of job seekers 104 may be people who have previously worked for the job publisher 102 and therefore may not require training. Further, the second tier of job seekers 104 may be people that have at least one year of work experience in the specific industry. Moreover, the third tier of job seekers 104 may be people that have related work experience and have been rated highly among their peers. In various embodiments, a job publisher 102 may establish as many tiers as necessary or desired. In particular embodiments, these tiers are established at the time of publishing an available job, and the parameters defining each tier may be dynamically updated according to the needs of the job publisher 102.

In particular embodiments, the predetermined parameters of the tiered postings may include time limits for exposure to each tier. For example, if a job publisher 102 published a job to the first tier of job seekers 104 but has not filled the role after a week, the published job may be automatically configured to increase the exposure of the published job to the next tier of job seekers 104 because the one week time limit has expired. In one embodiment, allowing the job to publish to a new tier of job seekers 104 may remove the job from the previous tier, or both tiers may have exposure to same published job simultaneously. In certain embodiments, this process of automatically publishing jobs to new tiers after a predetermined time may continue until either the job posting has been filled or the job posting expires despite being published to each preconfigured tier. In one embodiment, the job postings include predetermined parameters and rules that are configured during the creation of the job posting, and may be later reconfigured as necessary or desired.

Prioritized and Scheduled Posting

In one embodiment, the present system allows for administrators/employers to prioritize job postings. For example, an administrator may publish several jobs in a single day that each have a start date within the same 7-day period. According to various aspects of the present disclosure, these jobs may be assigned a priority level by the publisher 102 based on start date, operational dependency/urgency to fill, deadlines, or other appropriate business factors. Consider an example where two positions posted using the system and both are scheduled to start within only a few days of each other. In one embodiment, the first position may be assigned urgent priority and the second may be assigned low priority due to their respective operational dependency and urgency to fill. For example, the urgent priority position may be more important in regards to maintaining daily business operations whereas the low priority position may remain unfilled for a longer period of time without substantial consequences.

In particular embodiments, job postings and notifications can be published at scheduled times according to the priority and nature of the job. Additionally, notifications for higher prioritized job postings may be distributed more frequently than lower prioritized job postings. For example, an urgent warehousing job may be published at 9 PM on a Wednesday and notifications for that job may be pushed to job seekers 104 at 6 AM and 6 PM throughout the life of the job posting. In one embodiment, notifications for a medium or low priority job may only be pushed to job seekers 104 at 6 AM only. It should be understood from the discussion herein that the times and dates used are intended to portray the exemplary functionality of the present systems and methods and should not limit the disclosure.

Employment Awareness

In one embodiment, job seekers 104 in selected tiers may currently be employed with another company or job publisher. According to various aspects of the present disclosure, these job seekers 104/employees may be able to view published job postings available at other employers but may not receive notifications regarding these published job postings because they are currently employed with another company. In various embodiments, this scenario is the result of a "lock-in period", whereby a job publisher 102/employer may elect to exclude their current employees from receiving employment notifications from other companies. For example, an employee currently under contract with a home improvement store may be able to see, on the online platform, that a competitive store currently has an available job posting that is similar to his/her current job with the first store, but the employee will not receive a notification regarding the job published from the second store via the disclosed system.

In certain embodiments, employers may be able to view when the contract of an employee that is currently in a lock-in period will expire, and furthermore plan their future job postings based on these and similar time restrictions. In one embodiment, this feature allows for administrators/employers to have a better understanding of the availability of potential employees. Continuing with the example above, the second store may decide to delay or strategically plan their job postings based on certain employees that are currently locked-in with the first store in an effort acquire them when their current contract with the first store expires. In particular embodiments, this feature also allows currently employed users of the system to not be distracted or poached by other employers.

EXEMPLARY ARCHITECTURE

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Conclusion

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A method for publishing opportunity postings by a processor on a web-based platform, comprising the steps of:

defining, via a user interface of a web-based platform, a plurality of publishing parameters and a plurality of notification parameters, wherein the plurality of publishing parameters include one or more first segment publishing parameters for a first segment and one or more second segment publishing parameters for at least a second segment, wherein the plurality of publishing parameters include a first segment publication time period for the first segment and at least a second segment publication time period for the at least a second segment, wherein the plurality of notification parameters include a plurality of push notifications for urgent priority opportunity postings and a single push notification for non-urgent priority opportunity postings;

generating, by the processor, the opportunity posting according to the plurality of publishing parameters;

accessing, by the processor, a database of opportunity candidates;

identifying, by the processor, one or more candidates in the database of opportunity candidates that are associated with criteria that match at least a portion of the plurality of publishing parameters, wherein identifying the one or more candidates in the database of opportunity candidates includes filtering the one or more candidates into the first segment and the at least a second segment according to the one or more first segment publishing parameters for the first segment and the one or more second segment publishing parameters for the at least a second segment;

transmitting, by the processor, the opportunity posting to one or more electronic computing devices corresponding to the identified one or more candidates, thereby causing an alert corresponding to the opportunity posting on the one or more computing devices, wherein transmitting the opportunity posting to the one or more electronic computing devices corresponding to the identified one or more candidates includes:

determining, by the processor, a locked-in status for the one or more candidates, wherein the locked-in status defines the availability of the one or more candidates to receive opportunities based on current employment engagements;

transmitting, by the processor, the opportunity posting to the one or more candidates of the first segment based upon, at least in part, the first segment publication time period, wherein transmitting the opportunity posting to the one or more candidates of the first segment includes preventing the transmitting of the opportunity posting to the one or more candidates with the locked-in status;

determining, by the processor, that the opportunity posting is unfulfilled during the first segment publication time period; and in response to determining that the opportunity posting is unfulfilled during the first segment publication time period and that the first segment publication time period has expired, transmitting, by the processor, the opportunity posting to the one or more candidates of the at least a second segment based upon, at least in part, the at least a second segment publication time period, wherein transmitting the opportunity posting to the one or more candidates of the at least a second segment includes preventing the transmitting of the opportunity posting to the one or more candidates with the locked-in status; and transmitting, by the processor, one or more push notifications for the opportunity posting based upon, at least in part, the plurality of notification parameters, wherein transmitting the one or more push notifications includes preventing the transmitting of push notifications to the one or more candidates with the locked-in status.

2. The method of claim 1, wherein the alert is selected from the group comprising: a display of the opportunity posting on a display screen of each of the one or more electronic computing devices, a pop up notification on a display screen of each of the one or more electronic computing devices, a text message, and an audible alert.

3. The method of claim 1, wherein the tiered publishing parameters comprise criteria selected from the group comprising: prior experience, skills, education, and availability.

4. The method of claim 1, wherein a start time and an end time corresponding to the first predetermined time period is other than a start time and an end time corresponding to the second predetermined time period.

5. The method of claim 1, further comprising the step of, in response to transmitting the opportunity posting to the one or more electronic computing devices corresponding to the identified one or more candidates, receiving one or more responses for the identified one or more candidates to fulfill the opportunity posting.

6. The method of claim 1, wherein the predetermined publishing parameters comprise time limits for how long the opportunity is presented to the one or more identified candidates.

7. The method of claim 1, wherein the predetermined publishing parameters comprise priority indicators representative of the urgency of the opportunity to be fulfilled.

8. The method of claim 7, wherein the priority indicators comprise priority levels of low, medium, and urgent.

9. A system for publishing opportunity postings on a web-based platform, the system comprising:

an electronic computing device corresponding to a publisher;

a database of opportunity candidates;

one or more electronic computing devices corresponding to opportunity candidates stored within the database; and a cloud-based computing architecture comprising at least a processor operatively connected the electronic computing device corresponding to the publisher, the database of opportunity candidates, and the one or more electronic computing devices corresponding to the opportunity candidates stored within the database, the processor operable to:

define a plurality of publishing parameters and a plurality of notification parameters, wherein the plurality of predetermined publishing parameters include one or more first segment publishing parameters for a first segment and one or more second segment parameters for at least a second segment, wherein the plurality of predetermined publishing parameters include a first segment publication time period for the first segment and at least a second segment publication time period for the at least a second segment, wherein the plurality of notification parameters include a plurality of push notifications for urgent priority opportunity postings and a single push notification for non-urgent priority opportunity postings;

generate the opportunity posting according to the plurality of publishing parameters;

access the database of opportunity candidates;

identify one or more candidates in the database of opportunity candidates that are associated with criteria that match at least a portion of the plurality of publishing parameters, wherein identifying the one or more candidates in the database of opportunity candidates includes filtering the one or more candidates into the first segment and the at least a second segment according to the one or more first segment publishing parameters for the first segment and the one or more second segment publishing parameters for the at least a second segment;

transmit the opportunity posting to one or more electronic computing devices corresponding to the identified one or more candidates, thereby causing an alert corresponding to the opportunity posting on the one or more computing devices, wherein transmitting the opportunity posting to the one or more electronic computing devices corresponding to the identified one or more candidates includes:

determining a locked-in status for the one or more candidates, wherein the locked-in status defines the availability of the one or more candidates to receive opportunities based on current employment engagements;

transmitting the opportunity posting to the one or more candidates of the first segment based upon, at least in part, the first segment publication time period, wherein transmitting the opportunity posting to the one or more candidates of the first segment includes preventing the transmitting of the opportunity posting to the one or more candidates with the locked-in status;

determining that the opportunity posting is unfulfilled during the first segment publication time period; and in response to determining that the opportunity posting is unfulfilled during the first segment publication time period and that the first segment publication time period has expired, transmitting the opportunity posting to the one or more candidates of the at least a second segment based upon, at least in part, the at least a second segment publication time period, wherein transmitting the opportunity posting to the one or more candidates of the at least a second segment includes preventing the transmitting of the opportunity posting to the one or more candidates with the locked-in status; and transmit one or more push notifications for the opportunity posting based upon, at least in part, the plurality of notification parameters, wherein transmitting the one or more push notifications includes preventing the transmitting of push notifications to the one or more candidates with the locked-in status.

10. The system of claim 9, wherein the alert is selected from the group comprising: a display of the opportunity posting on a display screen of each of the one or more electronic computing devices, a pop up notification on a display screen of each of the one or more electronic computing devices, a text message, and an audible alert.

11. The system of claim 9, wherein the tiered publishing parameters comprise criteria selected from the group comprising: prior experience, skills, education, and availability.

12. The system of claim 9, wherein a start time and an end time corresponding to the first predetermined time period is other than a start time and an end time corresponding to the second predetermined time period.

13. The system of claim 9, wherein the processor is further operable to, in response to transmitting the opportunity posting to the one or more electronic computing devices corresponding to the identified one or more candidates, receive one or more responses for the identified one or more candidates to fulfill the opportunity posting.

14. The system of claim 9, wherein the predetermined publishing parameters comprise time limits for how long the opportunity is presented to the one or more identified candidates.

15. The system, of claim 9, wherein the predetermined publishing parameters comprise priority indicators representative of the urgency of the opportunity to be fulfilled.

16. The system of claim 15, wherein the priority indicators comprise priority levels of low, medium, and urgent.

* * * * *